United States Patent Office 3,158,324
Patented Nov. 24, 1964

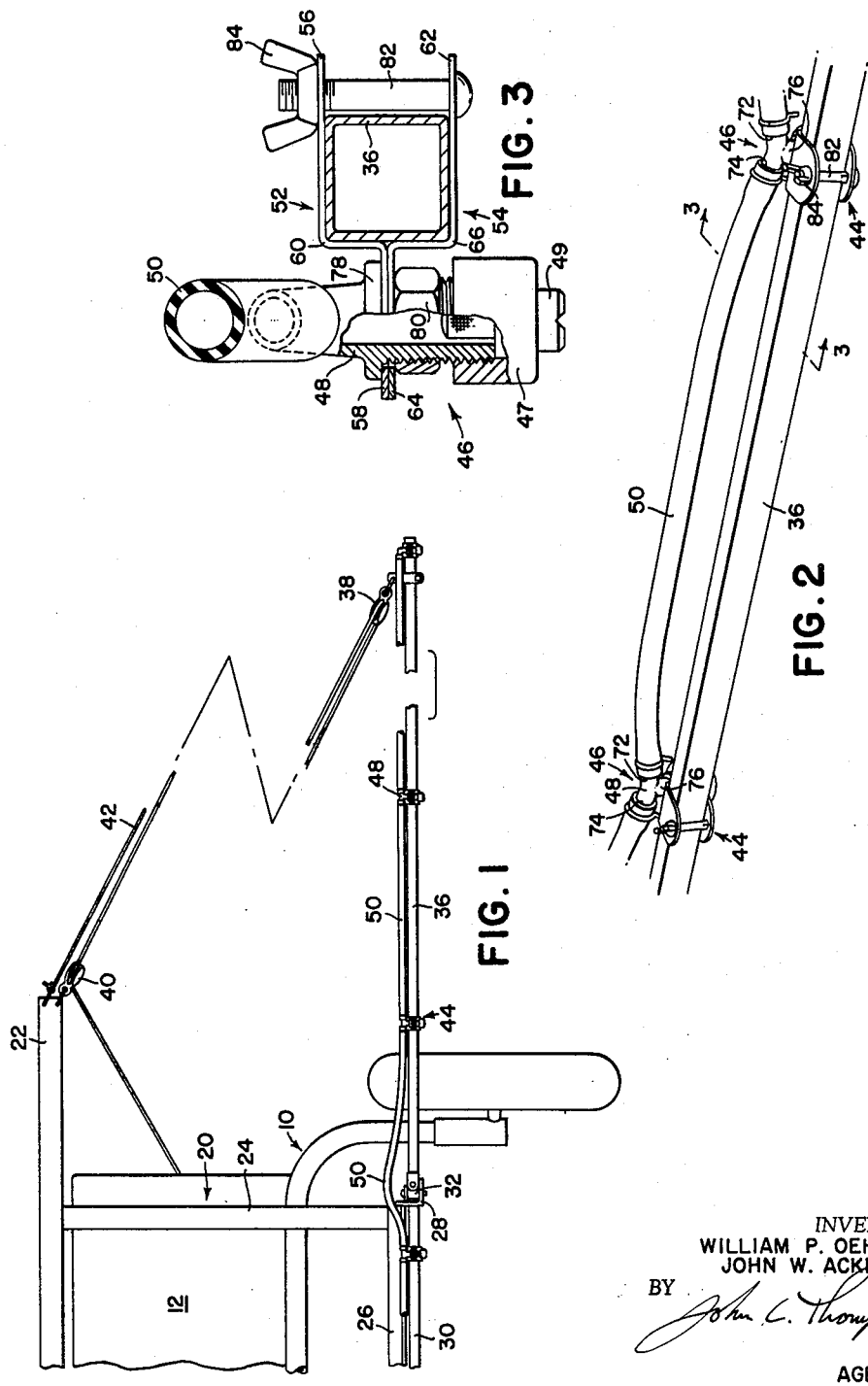

3,158,324
SPRAYER BOOM
William P. Oehler and John W. Ackley, both of Moline, Ill., assignors to Deere & Company, Moline, Ill., a corporation of Delaware
Filed Nov. 10, 1961, Ser. No. 151,561
8 Claims. (Cl. 239—159)

The present invention relates to agricultural machines and more particularly to sprayers and the like for distributing chemical weed destroyers and other spray materials.

The object and general nature of the present invention is the provision of a sprayer boom in which the nozzles are longitudinally adjustable along the boom. More particularly, it is an object of the present invention to provide a non-circular sprayer boom having clamped thereon nozzles which are longitudinally adjustable along the boom. Another object of the present invention is to provide nozzles having Y-shaped bodies, whereby when the nozzles are moved longitudinally towards each other, the flexible conduits between the nozzles will be flexed upwardly rather than downwardly thus insuring that the flexible conduits are outside of the spray patterns, to permit closer adjustment between the nozzles, and for less flexing of the flexible conduit.

A still further object of the present invention is to provide means to clamp the nozzles to the non-circular boom whereby the nozzles may be easily secured to the boom and yet not be free to rotate about the boom. It is a still further object of this invention to provide an apparatus which is relatively simple in design and construction, inexpensive, easy to assembly and disassemble, and extremely efficient for its intended purpose.

These and other objects and advantages of the present invention will become apparent to those skilled in the art after a consideration of the following detailed description, taken in conjunction with the accompanying drawings, in which:

FIG. 1 is a rear view of the right half of a sprayer in which the principles of the present invention have been incorporated, the left half being symmetrical with the right half and the outer spray booms being shown in their operative extended position.

FIG. 2 is a detail perspective view taken from the front of a portion of a boom in which Y-shaped nozzle bodies are employed.

FIG. 3 is a view taken along lines 3—3 of FIG. 2 showing the mounting bracket for the nozzle secured about the boom, the nozzle being shown partially in section.

In the following description it is to be understood that while only the right half of the sprayer embodying applicant's invention is illustrated in FIG. 1 and described, the description applies equally to the left half of the sprayer which is symmetrical to the right half.

The spraying apparatus of the present invention includes a wheeled frame 10 which carries a tank 12. Mounted to the rear of the frame 10 is a boom frame 20 which includes a top bar 22, vertically disposed bars 24, (only one of them being shown), and a lower bar 26. Mounted at each end of the lower bar 26 is an angle bracket 28. Secured at its ends to the vertical flanges of the bracket 28 is an intermediate boom member 30. Mounted on each horizontal flange of the depending bracket 28 is pivot member 32 to which is pivoted an outer boom 36. The outer end of the boom 36 carries a boom pulley 38, and each end of the top bar 22 carries a boom frame pulley 40. Interconnecting the two pulleys at each side of the sprayer is a rope 42 which is adapted to raise and lower the associated outer boom.

Adjustably mounted on the intermediate and outer booms are a plurality of mounting brackets, generally indicated at 44, which carry nozzles 46. As best seen in FIG. 3, the nozzles 46 are composed of nozzle caps 47, nozzle bodies 48, nozzle tips 49, and nozzle nuts 80. The nozzle bodies 48 may be of the conventional T-shaped construction as illustrated in FIG. 1, or preferably they are of Y-shaped construction as illustrated in FIG. 2. The nozzles 46 are interconnected by a plurality of fluid conduits 50. The spraying apparatus includes conventional means, not shown, to supply fluid under pressure from the tank 12 to the flexible conduits 50.

Referring to FIG. 3 it can be seen that the mounting brackets include two nozzle clamps 52 and 54 which are disposed above and below the boom. The top clamp 52 has a first or front section 56, a second or rear section 58, and an intermediate portion 60. Similarly, the lower nozzle clamp 54 has a front section 62, a rear section 64, and an intermediate portion 66. Preferably these clamps are identical parts. The front and rear sections 56, 58, 62, and 64 are provided with alined apertures.

The nozzle body 48 has inlet and outlet arms 72 and 74, respectively, which converge to a vertical discharge leg 76. The discharge leg is in the form of a threaded shank that extends through the alined openings of rear sections 58 and 64, and has an upper peripheral rib 78 which abuts the top of the rear section 58. The vertical leg 76 is threaded from end to end below the peripheral rib and receives a nut 80 which holds the rear sections 58 and 64 between the peripheral rib and the nut. Passing through the alined apertures of the sections 56 and 62 is a threaded fastener 82. The nozzle clamps are securely fastened to the boom frame 20 by means of a wing nut 84 which engages with the threaded fastener 82.

To longitudinally adjust the nozzles of applicant's sprayer to different positions along the boom, it is merely necessary to loosen the wing nuts 84, slide the mounting brackets 44 either towards or away from one another as desired, and then retighten the wing nuts 84. By employing applicant's nozzle clamps and the square boom tube it is only necessary to tighten the fastener 82 and the wing nut 84 to finger tightness to prevent longitudinal movement of the mounting bracket 44. Further tightening is not necessary since there will be no tendency for the nozzles to rotate about the boom due to the non-circular configuration of the boom and mating nozzle clamps.

As can be seen from FIG. 2 when the preferred Y-shaped nozzle bodies are moved towards one another the flexible conduit that interconnects the nozzles will be flexed upwardly. By having the flexible conduit flexed upwardly rather than downwardly as would happen with a T-shaped nozzle body, the flexible conduits are positioned above and outside of the spray pattern. The Y-shaped nozzle bodies also permit closer adjustment between the nozzles, and reduce the amount of flexing in the flexible conduits.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire by Letters Patents is:

1. In an apparatus of the character described; a boom of non-circular cross section; a plurality of mounting brackets mounted on the boom, each of said mounting brackets comprising two nozzle clamp plates disposed on opposite sides of the boom, the plates having first and second sections extending on opposite sides of the boom and intermediate portions adjacent the boom with at least one portion conforming to a non-circular portion of the boom in such a manner that the clamp plates cannot rotate about the boom, the sections of said plates having alined openings therein, and means passing through the alined openings in the first sections to secure the nozzle clamp plates to the boom; a plurality of nozzles, each of said nozzles including a body having inlet and outlet arms converging to a discharge leg, said leg extending through the alined openings of the second sections and having a peripheral rib abutting said sections, the discharge leg being threaded below the peripheral rib, and a nut threadedly mounted on the leg and holding the second sections between the peripheral rib and the nut; and a plurality of flexible conduits interconnecting the arms of the nozzles.

2. In an apparatus of the character described; a boom of non-circular cross section; a plurality of mounting brackets mounted on the boom, each of said mounting brackets comprising nozzle clamping means disposed on opposite sides of the boom, the clamping means having movable, oppositely disposed portions adjacent the boom with at least one portion conforming to a non-circular portion of the boom in such a manner that the clamping means cannot rotate about the boom, and means to secure the oppositely disposed portions to the boom; a plurality of nozzles, each of said nozzles including a Y-shaped body having inclined inlet and outlet arms converging to a substantially vertically disposed discharge leg, said body being secured to the clamping means; and a plurality of flexible conduits interconnecting the arms of the nozzles.

3. In an apparatus of the character described; a boom; a plurality of mounting brackets slidably mounted on the boom, each of said mounting brackets including a section having an opening therein; a plurality of nozzles, each of said nozzles including a Y-shaped body having inclined inlet and outlet arms converging to a discharge leg extending through the opening in said section, said leg having a peripheral rib abutting the section, the discharge leg being threaded below the peripheral rib, and a nut threadedly mounted on the leg and holding the section between the peripheral rib and the nut; and a plurality of flexible conduits interconnecting the arms of the nozzles.

4. In an apparatus of the character described; a boom of substantially square cross section; a plurality of mounting brackets mounted on the boom, each of said mounting brackets comprising two nozzle clamp plates disposed above and below the boom, the clamp plates having front and rear sections extending forwardly and rearwardly of the boom respectively and intermediate portions adjacent the boom with at least one portion shaped to extend around one rearward corner of the boom, the sections of said clamp plates having alined openings therein, and a threaded fastener passing through the alined openings in the front sections to secure the plates to the boom; a plurality of nozzles, each of the nozzles including Y-shaped body having inclined inlet and outlet arms converging to a vertical discharge leg extending through the alined openings of the rear sections and having a peripheral rib abutting one of the sections, the discharge leg being threaded below the peripheral rib, and a nut threadedly mounted on the leg and holding the rear sections between the peripheral rib and the nut; and a plurality of flexible conduits interconnecting the arms of nozzles.

5. In an apparatus of the character described; a boom of non-circular cross section; a plurality of mounting brackets mounted on the boom, each of said mounting brackets including two nozzle clamp plates disposed on opposite sides of the boom, the plates having first and second sections extending on opposite sides of the boom and intermediate portions adjacent the boom with at least one portion conforming to a non-circular portion of the boom in such a manner that the clamp plates cannot rotate about the boom, the sections of said clamp plates having alined openings therein, a fastener passing through the alined openings in the first sections to secure the clamp plates to the boom; a plurality of nozzles, each of said nozzles including a discharge leg extending through the alined openings of the second sections and having a portion abutting the sections, the discharge leg being threaded below the abutting portion, and a nut threadedly mounted on the leg and holding the second sections between the abutting portion and the nut; and a plurality of flexible conduits interconnecting the nozzles.

6. The inventon set forth in claim 5, in which the nozzles include Y-shaped bodies having inclined inlet and outlet arms which converge to the discharge leg.

7. In an apparatus of the character described; a boom of noncircular cross section; a plurality of mounting brackets mounted on the boom, each of said mounting brackets including two nozzle clamp plates disposed on opposite sides of the boom, the plates having first and second sections extending on opposite sides of the boom and intermediate portions adjacent the boom with at least one portion conforming to a noncircular portion of the boom in such a manner that the clamp plates cannot rotate about the boom, the sections of said clamp plates having alined openings therein, a fastener passing through the alined openings in the first sections to secure the clamp plates to the boom; a plurality of nozzles, each of said nozzles including a discharge leg extending through the alined openings of the second sections, means to hold the second sections about said discharge leg, and a plurality of conduits interconnecting the nozzles.

8. The invention set forth in claim 7, in which the nozzles include Y-shaped bodies having inclined inlet and outlet arms which converge to the discharge leg.

References Cited in the file of this patent

UNITED STATES PATENTS

| 912,966 | Lamiell | Feb. 16, 1909 |
| 1,368,957 | Miller | Feb. 15, 1921 |
| 1,583,619 | Splittstoser | May 4, 1926 |
| 2,975,983 | Niebling | Mar. 21, 1961 |

FOREIGN PATENTS

| 625,488 | Canada | Aug. 15, 1961 |